Patented Feb. 12, 1952

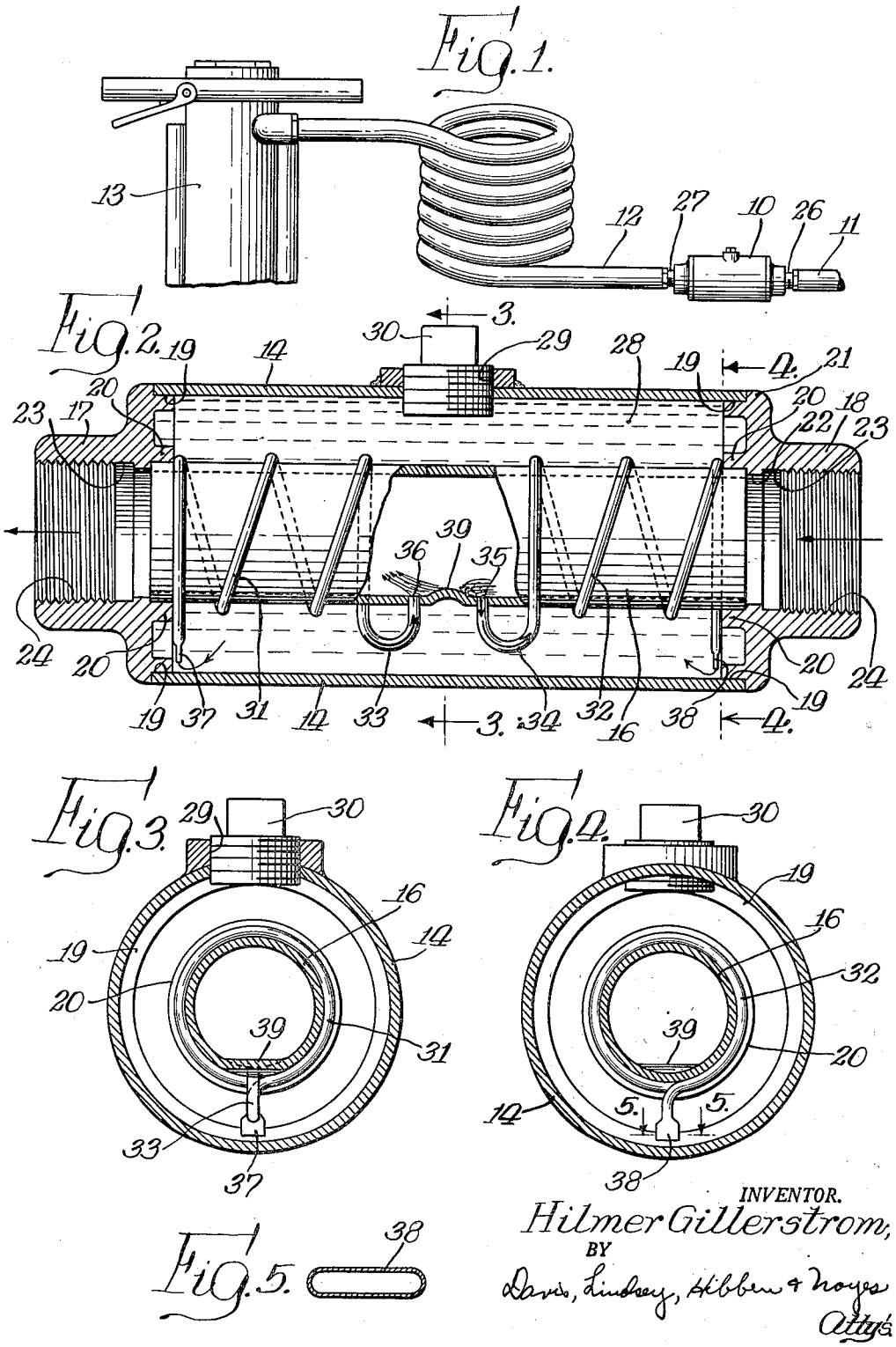

2,585,457

UNITED STATES PATENT OFFICE 2,585,457

AIR LINE LUBRICATOR FOR PNEUMATIC TOOLS

Hilmer Gillerstrom, Arcadia, Calif., assignor to Independent Pneumatic Tool Company, Chicago, Ill., a corporation of Delaware Application September 23, 1947, Serial No. 775,709

3 Claims. (Cl. 184—55)

This invention relates to pneumatic tools and more particularly to a lubricating unit adapted to be connected in the air supply line for a pneumatic tool and by which lubricating oil may be injected into the air current for transmission to the moving parts of the tool contacted by the air.

One of the principal objects of the present invention is to provide an improved lubricating unit adapted to be connected in the air supply line for pneumatic tools for supplying oil thereto.

Another object of the present invention is to provide a lubricating unit for air supply lines for pneumatic tools which is automatically self-regulating as to the quantity of oil delivered into the air stream, the amount of oil delivered varying substantially proportionately with the pressure and velocity of the current of air passing therethrough.

A further object is to provide a lubricating unit for air supply lines of pneumatic tools which is reversible and capable of operation from either end.

Still another object is to provide a lubricating unit for air supply lines for pneumatic tools having no movable parts requiring adjustment, and which is of simple and inexpensive construction and capable of a long operable life with little or no attention or service.

A still further object is to provide a lubricating unit for air supply lines for pneumatic tools comprising a hollow outer casing, a hollow inner casing within the outer casing providing an oil reservoir therebetween, the inner casing having areas of increased and reduced air pressure spaced from each other and connected to the oil reservoir.

A still further object is to provide a lubricating unit for air supply lines for pneumatic tools comprising two concentrically arranged cylindrical tubes forming an oil chamber therebetween and two helically arranged tubes of small diameter encircling said inner cylindrical tube and by means of which oil is sprayed into the air current, said small tubes being connected into said inner tube on either side of a transverse baffle and having their free open ends within the oil chamber.

Other objects and advantages of the present invention will become apparent as the following description progresses, reference being had to the accompanying drawing, in which:

Figure 1 is a front perspective view showing the general manner in which the improved lubricating unit is connected in the air supply line to a pneumatic tool, the tool and said supply line being broken away;

Fig. 2 is a vertical, longitudinal, sectional view of an air line lubricator in detached condition and comprising a preferred embodiment of the present invention;

Fig. 3 is a vertical, transverse sectional view taken on the line 3—3 in Fig. 2, looking in the direction of the arrows;

Fig. 4 is a vertical, transverse sectional view taken on the line 4—4 in Fig. 2, looking in the direction of the arrows; and Fig. 5 is a sectional view of the flared, flat end of the helical tubing taken on the line 5—5 in Fig. 4, looking in the direction of the arrows.

The air line lubricating unit comprising the present invention is indicated generally in Fig. 1 by the reference numeral 10 and is connected in the air supply line comprising flexible hose sections 11 and 12. The supply line section 11 may be connected to a source of air pressure such as a compressor (not shown), and the air line section 12 may be connected to a pneumatic tool 13, shown in incomplete form. The lubricating unit 10 is interposed in the air line between the sections 11 and 12 and serves to supply the air passing therethrough under pressure with the desired quantity of oil, the air and oil thereafter passing on through the line section 12 to the tool 13 where the oil is conveyed to the moving parts.

As shown more particularly in Figs. 2 to 5, inclusive, of the drawing, the lubricating unit 10 comprises an outer tubular casing 14 and an inner tubular casing 16 of lesser diameter arranged concentrically therein, the outer casing and inner casing being hollow and supported and maintained in proper concentric relationship by annular end caps 17 and 18 secured to the respective ends thereof. The end caps 17 and 18 are of identical construction, each having longitudinally directed and radially spaced annular flanges 19 and 20 and radially directed annular flanges 21 and 22 forming seating shoulders for the tubular casings 14 and 16, the outer casing 14 being supported on and secured to the outer surface of the flanges 19 and 21 and the inner casing 16 being supported within and secured to the inner surfaces of the flanges 20 and 22.

The end caps 17 and 18 are also provided with central, longitudinally extending openings 23 which are of substantially the same diameter as the opening through the inner tubular member 16 and which are arranged in alignment therewith. The outer portions of the openings 23 are internally threaded as at 24 and they are adapted to receive the threaded ends 26 and 27 of the air supply lines 11 and 12, respectively.

The annular space 28 between the outer tubular casing 14 and the inner tubular member 16 which is closed by the end caps 17 and 18, comprises an oil chamber or reservoir from which oil may be fed in a manner to be described hereinafter to the air current as it passes through the inner tubular casing 16. Access to the annular oil chamber 28 for the purpose of inserting additional quantities of oil is provided by means of a threaded opening 29 in the outer casing 14 in which opening is threadedly engaged a removable closure plug 30.

In order that the oil from the chamber 28 may be sprayed in the desired quantities into the current of air as it passes through the inner member 16, there are provided two sections 31 and 32 of tubing of relatively small inside diameter, the sections being disposed within the oil chamber 28 and wound helically about the outer periphery of the inner member 16. The sections 31 and 32 of the small tubing are of identical construction, section 31 being disposed about the left half of the inner member 16 and the section 32 being disposed about the right half thereof. The inner ends 33 and 34 of the small tubes 31 and 32 are formed in the shape of a U and the tips of these ends are secured within spaced and longitudinally aligned apertures 35 and 36, respectively, extending through the inner member 16 adjacent the central portion thereof. The last convolution of each of the small tubes 31 and 32 at the other ends thereof abut the inner ends of the annular flanges 20 of the end caps 17 and 18, the tubes 31 and 32 thus being confined against longitudinal movement along the inner member 16 between the end cap flanges 20 and the apertures 35 and 36, respectively. The free ends 37 and 38 of the helical tubes 31 and 32 extend downwardly or radially into close proximity to the inner surfaces of the outer casing 14 and they are flattened and flared, as shown in Fig. 5, for more efficient distribution of air and intake of oil, respectively.

As shown in Figs. 2 to 4, inclusive, of the drawing, the inner tubular member 16 between the two apertures 35 and 36 is provided with a transversely extending baffle or hump 39, being formed by pressing the tubular member 16 inwardly at that point. The baffle 39 is of restricted height so as not to impede the rapid and ready flow of air through the inner member 16, but at the same time its height is sufficient in cooperation with the adjacent apertures 35 and 36 to assist in the oil feeding operation which will now be described.

After the chamber 28 has been filled with oil having the proper characteristics for forming a spray to be carried by air under pressure, and after the lubricating unit 10 has been properly connected in the air line as shown in Fig. 1, the pneumatic tool 13 may be operated in the usual manner. Air under pressure passes from the supply line 11 into the inner member 16 through which it readily passes on into the supply line 12 to the tool 13 for operation thereof. As the air passes through the inner member 16 it strikes the slightly raised baffle 39 causing a concentration of air pressure in the area immediately before or rearwardly or upstream of the baffle, with the result that a considerable quantity of air under pressure is forced outwardly through the aperture 35 into the small tubing 32. The air under pressure then continues in a reverse direction through the small tubing 32 and out through the flared end 38 into the oil within the annular chamber 28. Because of the air pressure within the chamber 28, the oil at the other end of the chamber is forced upwardly within the small tube 31 through its flared end 37 and passes rearwardly through the tube 31 and out through the opening 36 on the forward or downstream side of the baffle 39. Because of the baffle 39, there is an area of decreased air pressure on the forward side thereof and the passage of air over the aperture 36 creates an injection action withdrawing the oil from the tube 31 in the form of a fine spray and forcing it into the air stream by which it is carried to the moving parts of the pneumatic tool.

From the foregoing description of the construction and mode of operation of the preferred embodiment of the present invention, it may be concluded that an air line lubricating unit has been provided which is of simple and inexpensive construction and which may be readily and quickly assembled. The unit is of such sturdy construction it may be subjected to considerable rough handling by inexperienced operators without breakage and without requiring any adjustment. It is apparent that the lubricating unit 10 is self-adjusting or self-regulating as to the quantity of oil to be supplied to the pneumatic tool and consequently no moving or adjustable parts are included. When the pneumatic tool 13 is being operated at a very rapid rate, thus requiring a relatively great amount of oil for proper lubrication of the fast moving parts, the pressure and velocity of the air will necessarily be greater with the result that an increased amount of oil will be sprayed by the unit 10 into the air stream. As the pressure and velocity of the air increases in the inner member 16, the air pressure within the small tubes 31 and 32 and the oil chamber 28 likewise increases. Conversely, as the pneumatic tool is being operated at a slower rate because of the reduced pressure and velocity of the air being delivered to it, the pressure within the tubes 31 and 32 and the oil chamber 28 is reduced and consequently less oil is sprayed into the current of air, such smaller amount of oil being fully satisfactory for the pneumatic tool operating at the slower rate.

It is also apparent that the air line lubricating device comprising the present invention may be operated from either end so that it is reversible, the operation thereof being exactly the same and equally efficient in either position. This reversibility is due to the identity of construction of the device from end to end and it permits the lubricating unit to be attached either way to the air lines 11 and 12, thus further adapting itself to use by inexperienced operators. Furthermore, the construction permits substantially the entire volume of oil within the annular chamber 28 to be consumed without requiring the frequent addition of oil, this advantage resulting from the fact that the flared ends 37 and 38 of the helical tubes 31 and 32 are terminated closely adjacent the bottom of the chamber 28.

Although there has been illustrated in the accompanying drawing and described above, a lubricating unit for air supply lines of pneumatic tools comprising a preferred embodiment of the present invention, it will be apparent that changes in details of structure and operation may be made without departing from the spirit and scope of the appended claims.

I claim:

1. An air line lubricator for pneumatic tools comprising a hollow outer casing, a tubular inner casing of substantially uniform diameter supported within said outer casing in spaced relation thereto, the space between said outer and inner casings comprising an oil reservoir and the inner casing being adapted to receive and conduct air under pressure, baffle means in said inner casing intermediate the ends thereof in the path of flow of said air for creating an area of increased air pressure on the rearward, upstream side of said baffle means and an area of decreased air pressure on the forward, downstream side thereof, said inner casing having openings in its wall closely adjacent the rearward, upstream side and closely adjacent the forward, downstream side of the baffle means in said areas of increased and decreased air pressure, a tube secured at the opening at the rearward side of the baffle means and extending within said reservoir with its free open end terminating at the rearward end thereof, and a tube secured at the opening at the forward side of the baffle means and extending within said reservoir with its free open end terminating at the forward end thereof.

2. An air line lubricator for pneumatic tools comprising a hollow outer casing, a hollow inner casing supported within said outer casing in spaced relation thereto, the space between said outer and inner casings comprising an oil reservoir and the inner casing being adapted to receive and conduct air under pressure, baffle means in said inner casing intermediate the ends thereof in the path of flow of said air for creating an area of increased air pressure on the rearward, upstream side of said baffle means and an area of decreased air pressure on the forward, downstream side thereof, said inner casing having openings in its wall closely adjacent the rearward, upstream side and closely adjacent the forward, downstream side of the baffle means in said areas of increased and decreased air pressure, and a plurality of helically wound tubes supported on and about the outer periphery of said inner casing, one of said tubes having its forward end secured at the opening at the rearward side of the baffle means and its free open end terminating at the rearward end of the reservoir and the other of said tubes having its rearward end secured at the opening at the forward side of the baffle means and its free open end terminating at the forward end of the reservoir, said tubes having their free open ends abutting the opposite ends of said reservoir for retaining the tubes in place.

3. An air line lubricator for pneumatic tools comprising a pair of elongated inner and outer concentric conduits of substantially uniform diameter, closure members secured at the opposite ends of said conduits whereby to define an annular reservoir for lubricant therebetween, said closure members having openings therethrough in alignment with said inner conduit whereby to provide an air inlet and outlet for said inner conduit, an air baffle in said inner conduit comprising an integral inwardly bulged portion extending transversely of said inner conduit adjacent the lower side thereof, said inner conduit being provided with a pair of apertures disposed on opposite sides of said baffle and closely adjacent thereto, and a pair of tubular members each secured at one end in one of said apertures and having its opposite end open and disposed within said reservoir below said lower side of said inner conduit whereby to provide fluid passageways for the flow of air or lubricant therethrough dependent upon the direction in which air is passed through said inner conduit.

HILMER GILLERSTROM.

REFERENCES CITED

The following references are of record in the file of this patent:

UNITED STATES PATENTS

| Number | Name | Date |
| --- | --- | --- |
| 1,082,141 | Sites | Dec. 23, 1913 |
| 1,751,714 | Peters | Mar. 25, 1930 |
| 1,788,033 | Slater | Jan. 6, 1931 |
| 2,223,700 | Norgren | Dec. 3, 1940 |
| 2,308,773 | Norgren | Jan. 19, 1943 |

FOREIGN PATENTS

| Number | Country | Date |
| --- | --- | --- |
| 662,285 | France | 1929 |